3,072,689
PROCESS FOR PREPARATION OF IODIZED LECITHIN
Shiro Hayashi, Chigasaki-shi, Japan, assignor to Dai-Ichi Yakuhin Sangyo, Kabushiki Kaisha, Tokyo-to, Japan, a company of Japan
No Drawing. Filed Sept. 21, 1961, Ser. No. 139,619
10 Claims. (Cl. 260—403)

The present invention relates to a process for the preparation of iodized lecithin.

It is the object of the invention to provide iodine-containing medical preparations which are stable and non-hygroscopic and hence can be preserved for a long time; also, the preparations according to the invention are without harmful side effects of iodism or intestinal disturbances.

Generally speaking, the process according to the invention consists of dissolving lecithin in an organic solvent and in reacting the lecithin with iodine in the presence of a catalyst such as the periodide of iron, tin or antimony, at elevated temperature.

In the fields of medicine and pharmaceutics, iodine has been used from early days as external and internal medication. The external application is comparatively simple and does not pose a problem. However, its oral administration requires delicate adjustments as to its dosage and there have been many harmful effects. As internal medicine, iodine has been used in the form of potassium iodide and sodium iodide. But in all of these cases, when they are used continuously for a long period of time, it was usual that harmful side effects, such as intestinal disturbances, iodism, etc. appeared and hence their uses had to be discontinued. Furthermore, in most cases, the medicine is rather unpalatable since it has to be given in liquid form. Again, because of their highly hygroscopic character, those preparations made in the form of pills or tablets are of low stability and cannot be preserved for a long period of time. Several preparations made of potassium iodide and sodium iodide invariably irritate the mucous membrane of the stomach and hence impair the appetite even during a short period of their use. As a result, it is difficult to use them continuously. In order to overcome these shortcomings, there have been studies carried out on organic iodine compounds. But, because iodine has a comparatively weak affinity to organic compounds it was not easy to synthesize organic iodine compounds. To combine iodine with unsaturated fats or oils or with unsaturated fatty acids is comparatively simple and has been known for a very long time. But compounds of iodine with unsaturated fats or oils or with unsaturated fatty acids are unstable and easily decompose with liberation of iodine. Hence, they are not suitable as medical preparations. Moreover there is iodized casein made by combining iodine with casein. But its iodine content is small, only about 7 percent at the maximum. Thus, it has been difficult to synthesize an organic compound having a high iodine content.

As a result of various studies, the present inventor, by combining iodine with lecithin by means of a special catalyst, has succeeded in the synthesis in organic iodized lecithin of powder form, whose iodine content can be adjusted freely according to the dosage and which, unlike conventional medical iodine preparations, such as potassium iodide and sodium iodide, iodized oil, etc., is not hygroscopic and therefore of good stability and can be preserved for a long period of time; it has no harmful effect and is most suitable for the dosage of iodine.

The process for preparation or iodized lecithin will be more fully explained hereinafter. Lecithin is dissolved in an organic solvent, such as ether, chloroform, or carbon tetrachloride. To this is added a per-iodide of iron, tin or antimony. Then iodine is again added, and the resulting substance is heated to bring about a chemical reaction. After the completion of the chemical reaction the compound formed is washed several times in a solution of about 10 percent sodium thiosulfate in order to remove excessive unreacted iodine. The compound is then dehydrated by means of anhydrous sodium sulfate. Next, after the solvent has been removed by distillation, crude iodized lecithin is obtained in solid form. When this is refined by the use of anhydrous alcohol, iodized lecithin can be obtained as a brownish powder. Whereas the iodine content varies according to the amount of the added iodine, it is easy to obtain a compound containing over 20 percent of iodine. The amount of the catalyst to be used is preferably about 5 percent by weight, but it can be properly adjusted according to the density, reaction speed, reaction temperature, etc. of the solution.

In the following a number of examples is given to illustrate the invention.

EXAMPLE 1

100 grams of lecithin from which water and fat have been completely removed by means of acetone, are dissolved in carbon tetrachloride. To this are added, as catalyst, about 5 grams of separately prepared iron periodide powder. Further added are 20 grams of iodine. This mixture is heated for about 30 hours while being stirred so as to bring about a chemical reaction. After the completion of the chemical reaction, the compound formed is washed several times with a solution of 10 percent sodium thiosulfate and thereby unreacted iodine is removed. Then, the compound is dehydrated by means of anhydrous sodium sulfate. After dehydration is complete, the carbon tetrachloride is removed by distillation; then, 110 grams of crude iodized lecithin are obtained as brownish powder which is refined by means of anhydrous alcohol and thereafter dried in a drier, yielding 100 grams of iodized lecithin as a powder of a lighter brown.

EXAMPLE 2

100 grams of lecithin from which water and fat have been completely removed by means of acetone are dissolved in chloroform. To this are added as a catalyst about 5 grams of separately prepared tin periodide powder and further 20 grams of iodine. The mixture is heated for about 30 hours while being stirred so as to effect a chemical reaction. After the completion of the reaction, the compound formed is washed several times with a solution of 10 percent sodium thiosulfate, and free iodine is removed thereby. Then the compound is dehydrated by means of anhydrous sodium sulfate, and the chloroform is removed by distillation. The yield is 100 grams of crude iodized lecithin as a brownish powder. This is refined by means of anhydrous alcohol and dried in a drier; obtained are 100 grams of iodized lecithin as a powder of light brownish color.

EXAMPLE 3

100 grams of lecithin from which water and fat have been completely removed by means of acetone are dissolved in ether, and as a catalyst about 5 grams of separately prepared antimony periodide powder are added. Further added are 20 grams of iodine. This mixture is heated for about 30 hours while being stirred so as to bring about chemical reaction. After the completion of the reaction, the compound is washed several times with a 10 percent sodium thiosulfate solution, and free iodine is removed thereby. Dehydration by means of anhydrous sodium sulfate is then carried out and the ether is removed by distillation. 110 grams of crude iodized lecithin are obtained as a brownish powder. This is refined by means of anhydrous alcohol and then it is dried in a drier; obtained are 100 grams of iodized lecithin as a light brownish powder.

The result of analysis of the above-described product was as follows:

(1) Test For Free Iodine

When the product was dissolved in ether and then a potassium iodide-starch reagent test was carried out with it, there was no iodine discovered.

(2) Test for Ascertaining the Presence of Lecithin

The product was boiled in glacial acetic acid with addition of zinc metal powder whereby iodine was converted into zinc iodide, and distilled water was added, and filtrated, the residue was washed with absolute alcohol to remove acetic acid, then the residue was dissolved in 85% alcohol and filtrated; alcoholic cadmium chloride solution was added to the filtrate; and insoluble double salt was formed thereby from which was determined that lecithin was unchanged.

(3) Iodine Content

The product was boiled in glacial acetic acid with addition of zinc metal powder, whereby it was converted into zinc iodide. To this was added diluted hydrochloric acid and sodium cyanide, and iodic cyanide was produced. Then, a titration was carried out by means of a $$\frac{M}{20}$$

or 0.05 M potassium iodate solution. The result showed that the iodine content was 16.5 percent.

Iodized lecithin obtained by the present invention does not absorb moisture even when exposed to air. It is stable and can be preserved for a long period of time without causing iodine decomposition.

What I claim is:

1. A process for preparation of iodized lecithin which comprises dissolving lecithin in an organic solvent, adding iodine thereto and as a catalyst a member selected from the group consisting of the periodides of iron, tin and antimony.

2. A process for the preparation of iodized lecithin, which comprises dissolving lecinthin in carbon tetrachloride, adding iodine thereto and using as a catalyst periodide of iron, and thereafter heating the mixture so as to combine the iodine with lecithin.

3. A process for the preparation of iodized lecithin which comprises dissolving lecithin in carbon tetrachloride, adding iodine thereto, and using as a catalyst periodide of tin, and thereafter heating the mixture so as to combine the iodine with lecithin.

4. A process for the preparation of iodized lecithin which comprises dissolving lecithin in carbon tetrachloride, adding iodine thereto, and using as a catalyst periodide of antimony, and thereafter heating the mixture so as to combine the iodine with lecithin.

5. A process for the preparation of iodized lecithin which comprises dissolving lecithin in chloroform, adding iodine thereto, and using as a catalyst periodide of iron, and thereafter heating the mixture so as to combine the iodine with lecithin.

6. A process for the preparation of iodized lecithin which comprises dissolving lecithin in chloroform, adding iodine thereto, and using as a catalyst periodide of tin, and thereafter heating the mixture so as to combine the iodine with lecithin.

7. A process for the preparation of iodized lecithin which comprises dissolving lecithin in chloroform, adding iodine thereto, and using as a catalyst periodide of antimony, and thereafter heating the mixture so as to combine the iodine with lecithin.

8. A process for the preparation of iodized lecithin which comprises dissolving lecithin in ether, adding iodine thereto, and using as a catalyst periodide of iron, and thereafter heating the mixture so as to combine the iodine with lecithin.

9. A process for the preparation of iodized lecithin which comprises dissolving lecithin in ether, adding iodine thereto, and using as a catalyst periodide of tin, and thereafter heating the mixture so as to combine the iodine with lecithin.

10. A process for the preparation of iodized lecithin which comprises dissolving lecithin in ether, adding iodine thereto, and using as a catalyst periodide of antimony, and thereafter heating the mixture so as to combine the iodine with lecithin.

No references cited.